United States Patent
Liang et al.

(10) Patent No.: US 8,808,832 B2
(45) Date of Patent: *Aug. 19, 2014

(54) PLATE WITH EASY ASSEMBLY

(75) Inventors: Chen-Yi Liang, New Taipei (TW);
Cheng-Hsiang Chuang, New Taipei (TW); Hung-Chih Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 255 days.

This patent is subject to a terminal disclaimer.

(21) Appl. No.: 13/450,450

(22) Filed: Apr. 18, 2012

(65) Prior Publication Data

US 2013/0017358 A1 Jan. 17, 2013

(30) Foreign Application Priority Data

Jul. 12, 2011 (TW) .............................. 100124673 A

(51) Int. Cl.
*B32B 3/06* (2006.01)
*G06F 1/16* (2006.01)
*E05C 1/10* (2006.01)
*E05B 65/00* (2006.01)
*F16B 5/06* (2006.01)
*F16B 2/12* (2006.01)

(52) U.S. Cl.
CPC ............ *G06F 1/1613* (2012.01); *E05B 65/006* (2013.01); *F16B 5/0664* (2013.01); *F16B 5/0657* (2013.01); *E05C 1/10* (2013.01); *F16B 2/12* (2013.01)

USPC .................... 428/100; 312/223.1; 312/223.2; 428/99

(58) Field of Classification Search
USPC ..................... 428/100, 99; 312/223.1, 223.2
See application file for complete search history.

(56) References Cited

FOREIGN PATENT DOCUMENTS

| CN | 2613967 Y | 4/2004 |
| CN | 101426348 A | 5/2009 |
| CN | 101652057 A | 2/2010 |

OTHER PUBLICATIONS

Office action mailed on May 27, 2014 for the China application No. 201110204502.2, p. 3 line 5-20.

*Primary Examiner* — Brent O'Hern
(74) *Attorney, Agent, or Firm* — Winston Hsu; Scott Margo

(57) ABSTRACT

An ornamental plate structure includes a supporting base and a sliding button. The sliding button includes a button portion, a first sliding portion, and a fastening portion whereon an incline and a wedging slot are formed. The ornamental plate structure further includes an ornamental plate having a plate, a hooking component and a fixing component. The fixing component includes a wedging portion, a second sliding portion and an assembly surface. The wedging portion wedges inside the wedging slot after the assembly surface slides relative to the incline at a predetermined distance so as to fix the ornamental plate on the supporting base. The button portion is pushed to slide the first sliding portion relative to the second sliding portion so as to separate the wedging portion from the wedging slot. The ornamental plate structure further includes a resilient component for driving the sliding button.

10 Claims, 14 Drawing Sheets

PLATE WITH EASY ASSEMBLY

BACKGROUND OF THE INVENTION

1. Field of the Invention

The present invention relates to an ornamental plate structure, and more particularly, to an ornamental plate structure with easy assembly and surrounded by a supporting base.

2. Description of the Prior Art

Requirements of quality as well as aesthetic feeling of modern electronic products are getting higher and higher. For example, notebook computers with various ornamental plates become a trend in the market. Consumers are likely to buy the products due to preference for the ornamental plate with special patterns. Furthermore, an electronic product with a replaceable ornamental plate is even more popular in the market. However, mechanisms adapted to the replaceable ornamental plate of the notebook computer require more components and larger mechanical space. In addition, assembly of above-mentioned mechanisms is not convenient, either. For example, it is difficult to detach the ornamental plate when it is surrounded by other components. Thus, how to design an ornamental plate structure with easy assembly and less cost becomes an issue of the electronic device.

SUMMARY OF THE INVENTION

The present invention provides an ornamental plate structure for solving above drawbacks.

According to the claimed invention, an ornamental plate structure includes a supporting base and a sliding button. A slot and a hole are disposed on the supporting base. The sliding button is installed on a side of the supporting base in a slidable manner and includes a button portion, a first sliding portion and a fastening portion. The button portion is disposed through the hole on the supporting base in a slidable manner. The first sliding portion is disposed in a position corresponding to the slot on the supporting base. The fastening portion is connected to the first sliding portion and disposed in a position corresponding to the slot on the supporting base, and an incline and a wedging slot are formed on the fastening portion. The ornamental plate structure further includes an ornamental plate installed on the supporting base in a detachable manner. The ornamental plate includes a plate, a hooking component and a fixing component. The hooking component is installed on a side of the plate for hooking the supporting base. The fixing component is installed on the plate and includes a wedging portion, a second sliding portion and an assembly surface. The wedging portion wedges inside the wedging slot of the fastening portion after the assembly surface slides relative to the incline of the fastening portion at a predetermined distance, so as to fix the ornamental plate on the supporting base. The button portion drives the first sliding portion to slide relative to the second sliding portion when the button portion is pushed to move in a first direction inside the hole on the supporting base, so as to separate the wedging portion of the ornamental plate from the wedging slot on the fastening portion. The ornamental plate structure further includes a resilient component with both ends being respectively connected to the supporting base and the sliding button, for driving the sliding button, such that the wedging portion of the ornamental plate wedges the wedging slot on the fastening portion.

According to the claimed invention, the sliding button slides in the first direction when the assembly surface of the fixing component presses the fastening portion in a second direction and slides relative to the incline of the fastening portion, and the resilient component drives the sliding button to move in a direction opposite to the first direction when the assembly surface of the fixing component separates from the incline of the fastening portion, such that the wedging portion of the ornamental plate wedges inside the wedging slot of the fastening portion.

According to the claimed invention, the ornamental plate structure further includes a stopper installed on the supporting base for stopping the sliding button, so as to constrain deformation of the sliding button in the second direction.

According to the claimed invention, the assembly surface is an arc surface.

According to the claimed invention, the ornamental plate structure further includes a constraining component installed on the supporting base and disposed through an end of the sliding button for constraining the sliding button to slide in the first direction.

According to the claimed invention, the constraining component is an L-shaped rib.

According to the claimed invention, an inclined plane is formed on at least one side of the hole of the supporting base, for guiding the button portion to slide in the first direction.

According to the claimed invention, the ornamental plate structure further includes a hook installed on the supporting base for hooking the sliding button, so as to constrain moving direction of the sliding button.

According to the claimed invention, the ornamental plate structure further includes two resilient component hooks respectively installed on the supporting base and the sliding button for hooking both ends of the resilient component.

According to the claimed invention, the resilient component is a spring.

In summary, the ornamental plate structure of the present invention provides the detachable ornamental plate assembled and dissembled by sliding the sliding button and capable of being surrounded by other components. In addition, the ornamental plate structure of the present invention has advantages of simpler structures, fewer components and less mechanical space occupied. Accordingly, the present invention provides an ornamental plate structure with easy assembly and less assembly cost.

These and other objectives of the present invention will no doubt become obvious to those of ordinary skill in the art after reading the following detailed description of the embodiment that is illustrated in the various figures and drawings.

DETAILED DESCRIPTION

Figure 1:
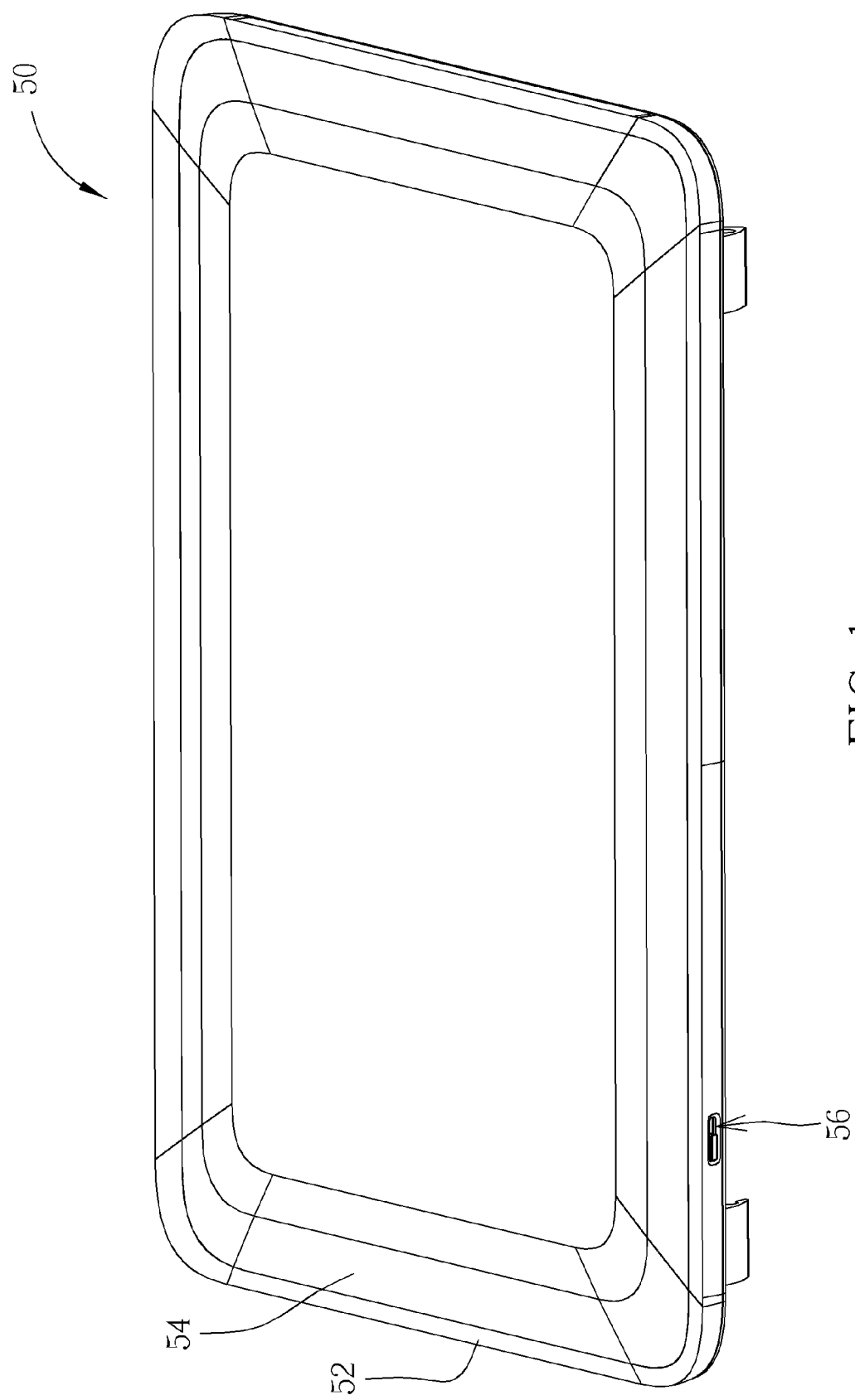
FIG. 1 is a diagram of an ornamental plate structure with easy assembly according to an embodiment of the present invention.
Figure 2:
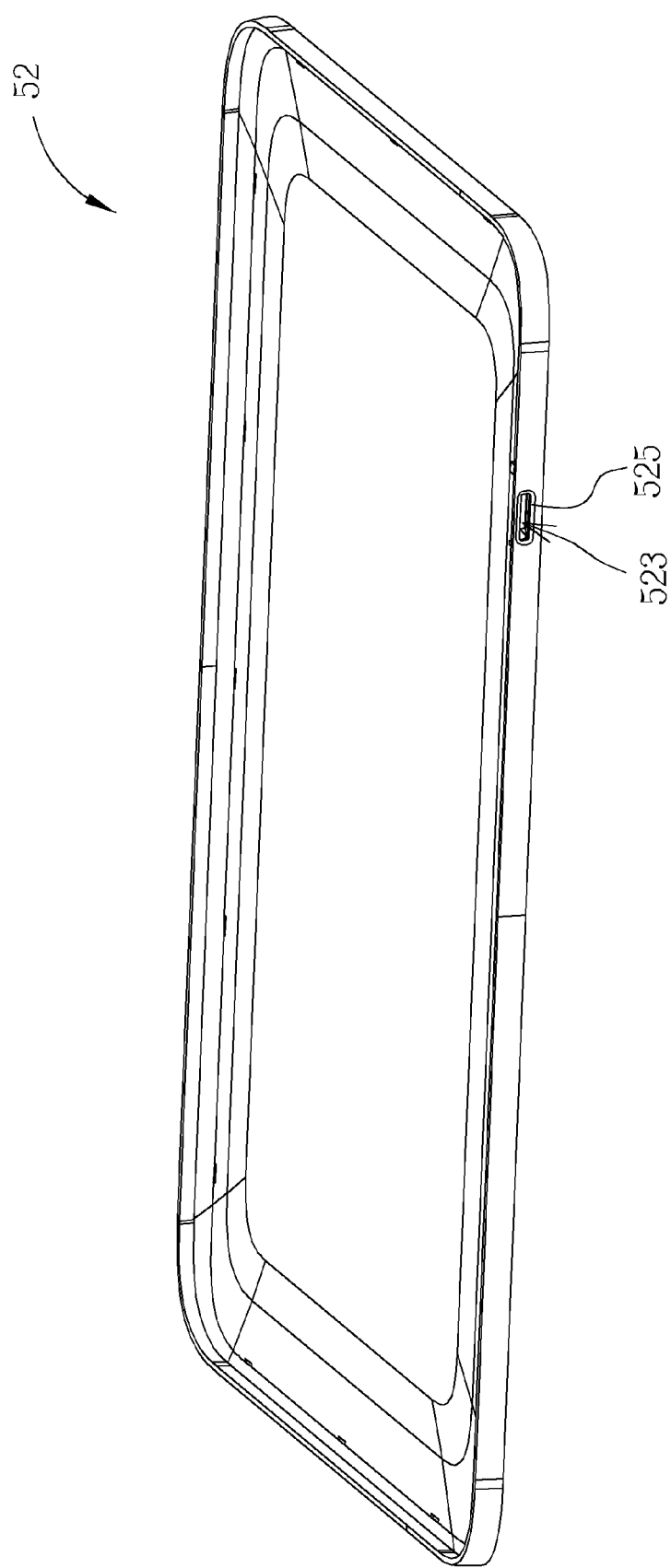
FIG. 2 and FIG. 3 are respectively diagrams of a supporting base in different views according to the embodiment of the present invention.
Figure 3:
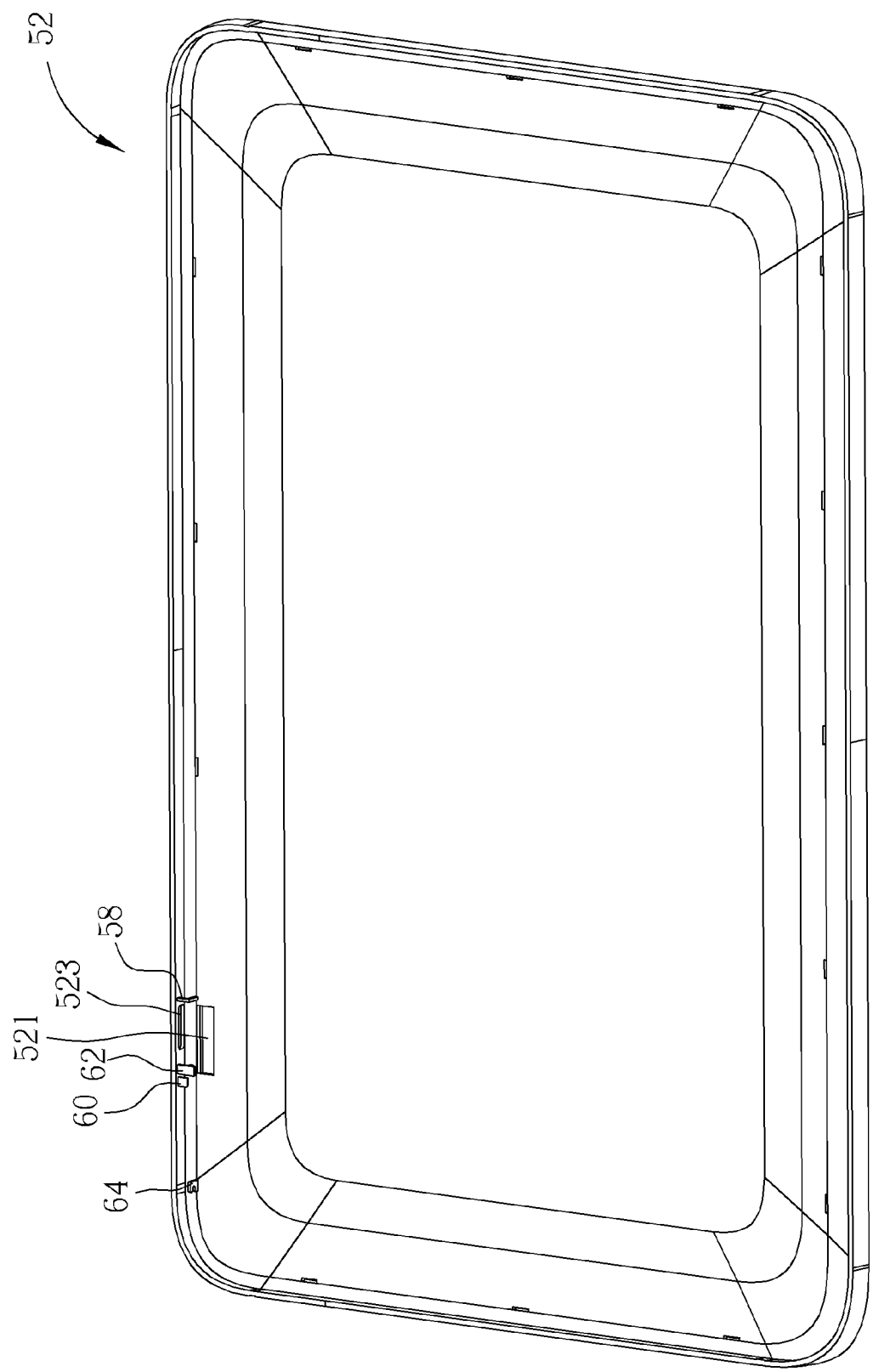
Figure 4:
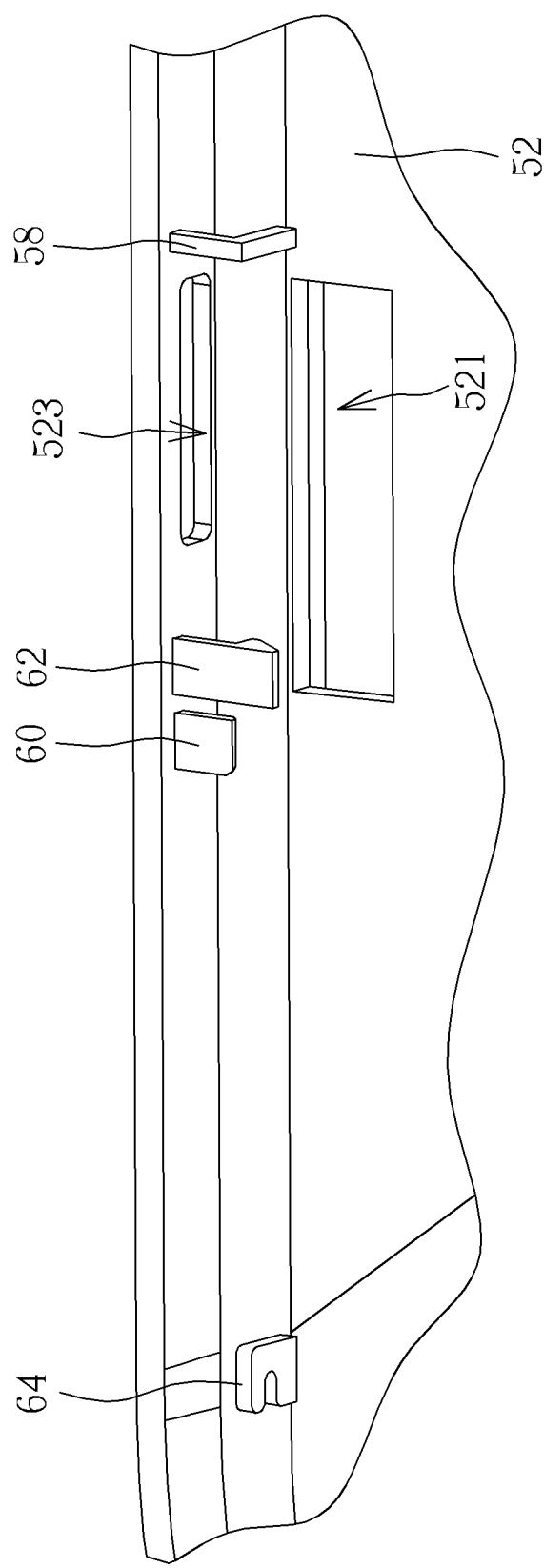
FIG. 4 is a partly enlarged diagram of the supporting base according to the embodiment of the present invention.

Please refer to FIG. 1. FIG. 1 is a diagram of an ornamental plate structure 50 with easy assembly according to an embodiment of the present invention. In this embodiment, the ornament plate structure 50 can be a detachable ornamental plate structure of a notebook computer. The ornament plate structure 50 includes a supporting base 52, an ornamental plate 54 and a sliding button 56. The sliding button 56 is installed on a side of the supporting base 52 in a slidable manner. A user can slide the sliding button 56 to detach the ornamental plate 54 from the supporting base 52, so as to replace the ornamental plate 54. Please refer to FIG. 2 to FIG. 4. FIG. 2 and FIG. 3 are respectively diagrams of the supporting base 52 in different views according to the embodiment of the present invention. FIG. 4 is a partly enlarged diagram of the supporting base 52 according to the embodiment of the present invention. A slot 521 and a hole 523 are disposed on the supporting base 52, and an inclined plane 525 is formed on at least one side of the hole 523 on the supporting base 52. The ornamental plate structure 50 further includes a constraining component 58, a stopper 60, a hook 62 and a resilient component hook 64. The constraining component 58, the stopper 60, the hook 62 and the resilient component hook 64 are installed on the supporting base 52, respectively. In this embodiment, the constraining component 58 can be an L-shaped rib. Alternatively, the constraining component 58 can be a structure combined with the stopper and the hook 62. In addition, the supporting base 52, the constraining component 58, the stopper 60, the hook 62 and the resilient component hook 64 can be integrally formed.

Figure 5:
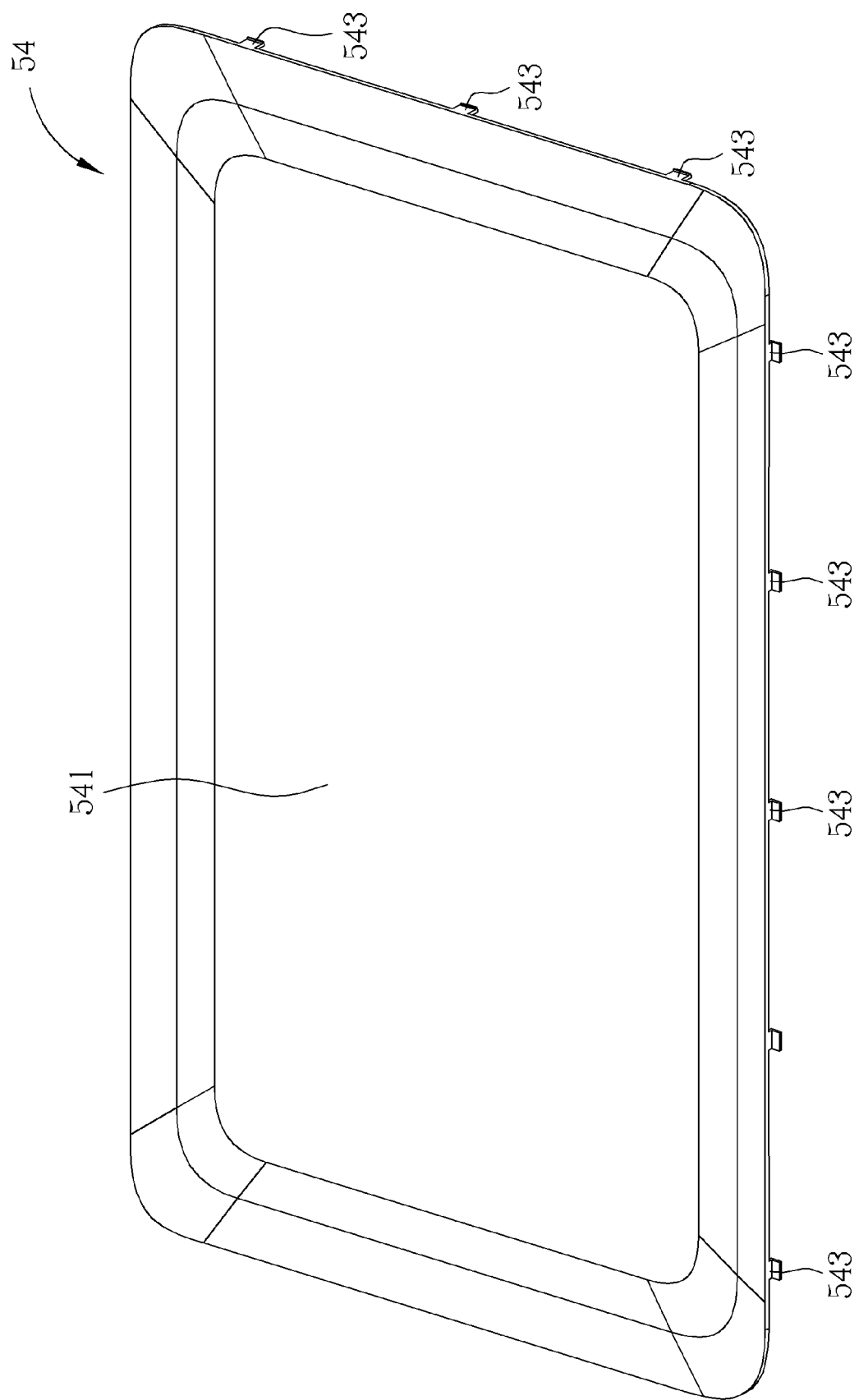
FIG. 5 and FIG. 6 are respectively diagrams of an ornamental plate in different views according to the embodiment of the present invention.
Figure 6:
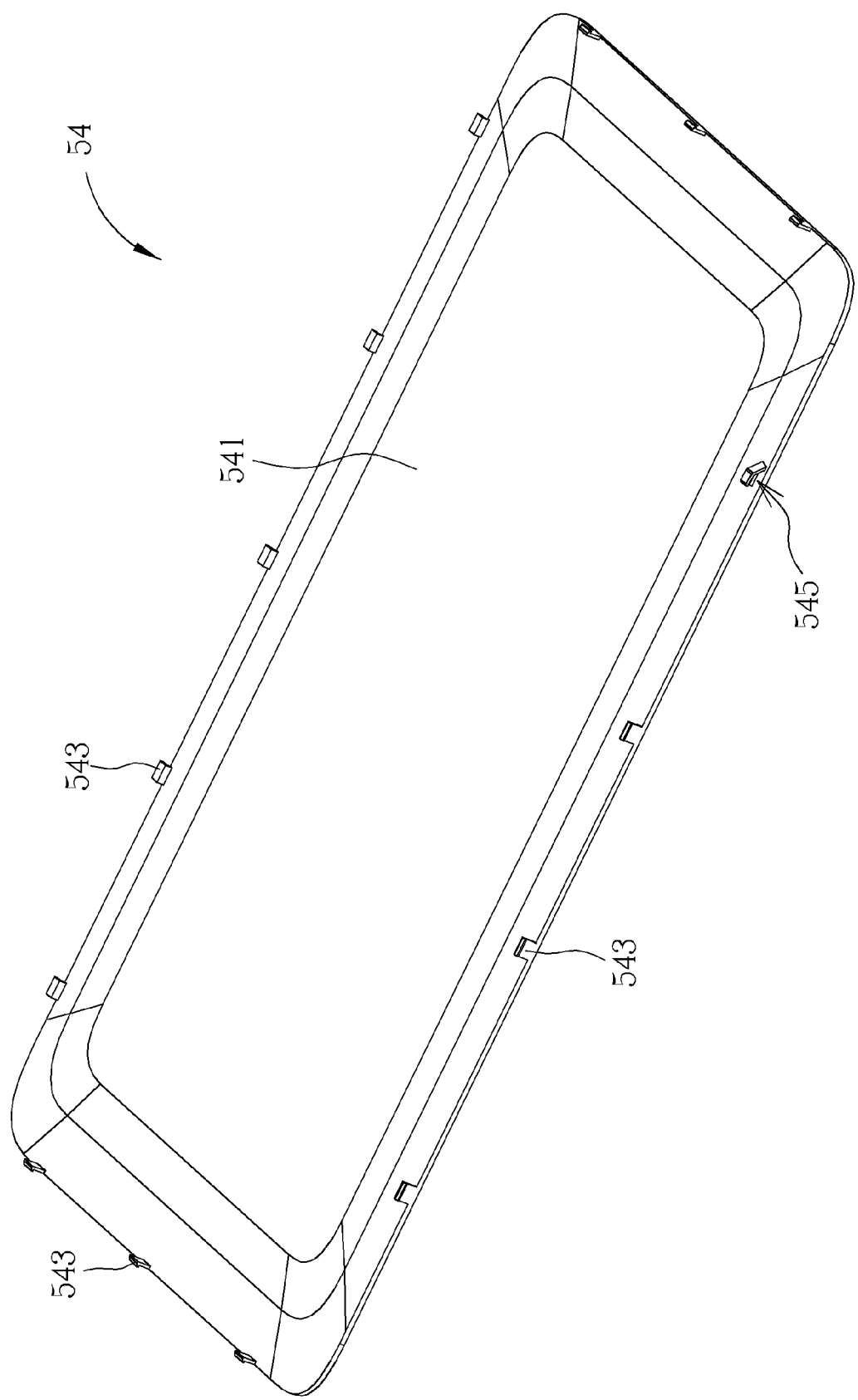
Figure 7:
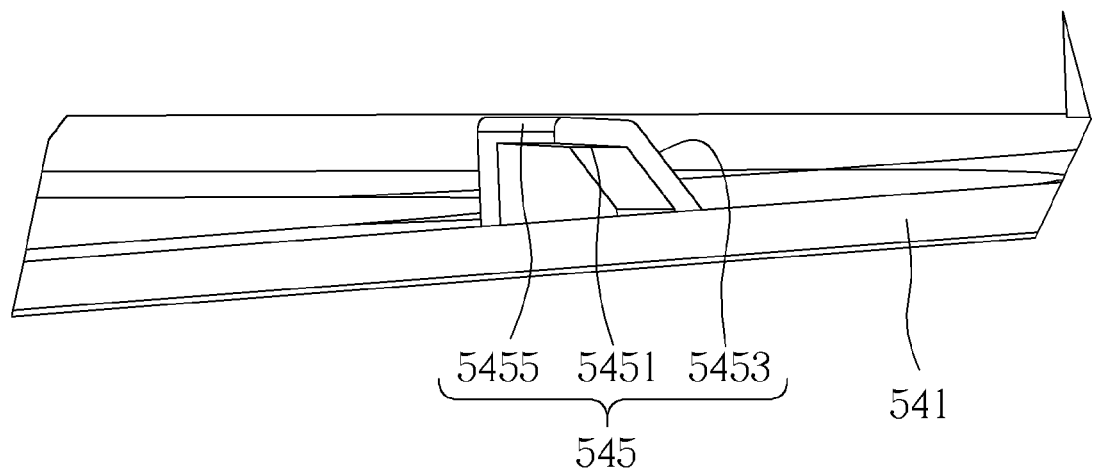
FIG. 7 is a partly enlarged diagram of the ornamental plate according to the embodiment of the present invention.
Figure 8:
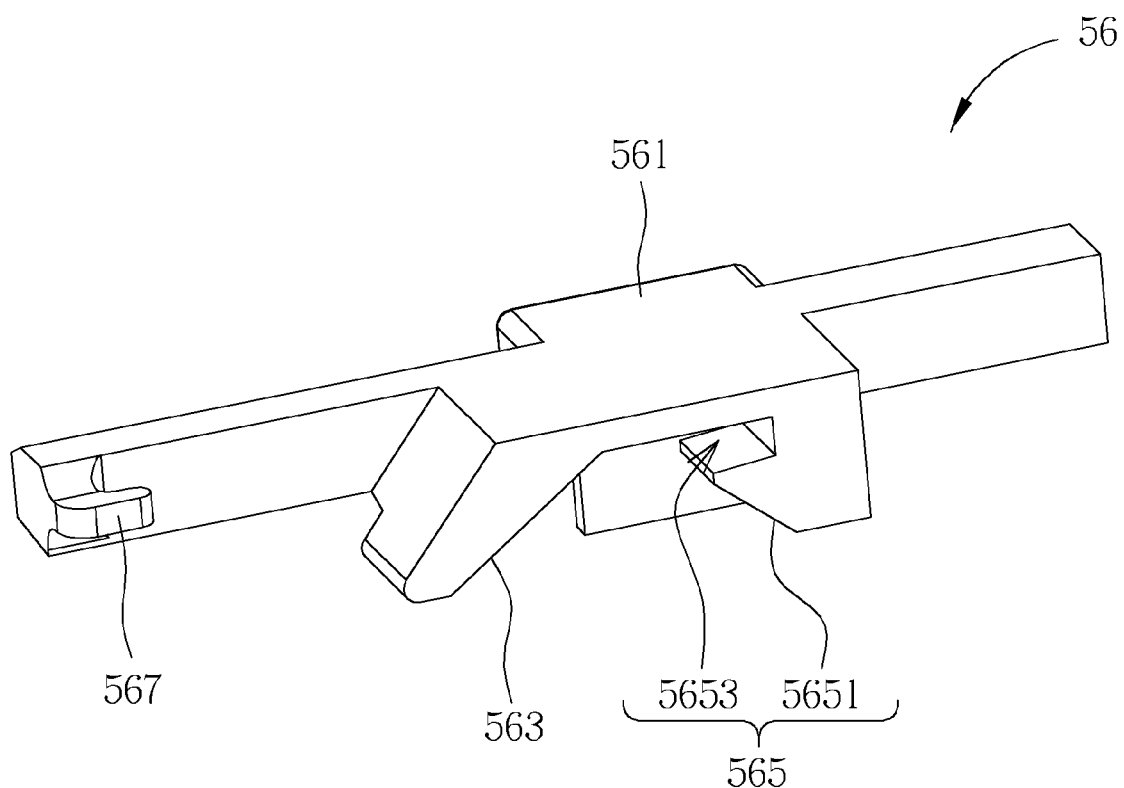
FIG. 8 and FIG. 9 are respectively diagrams of a sliding button in different views according to the embodiment of the present invention.
Figure 9:
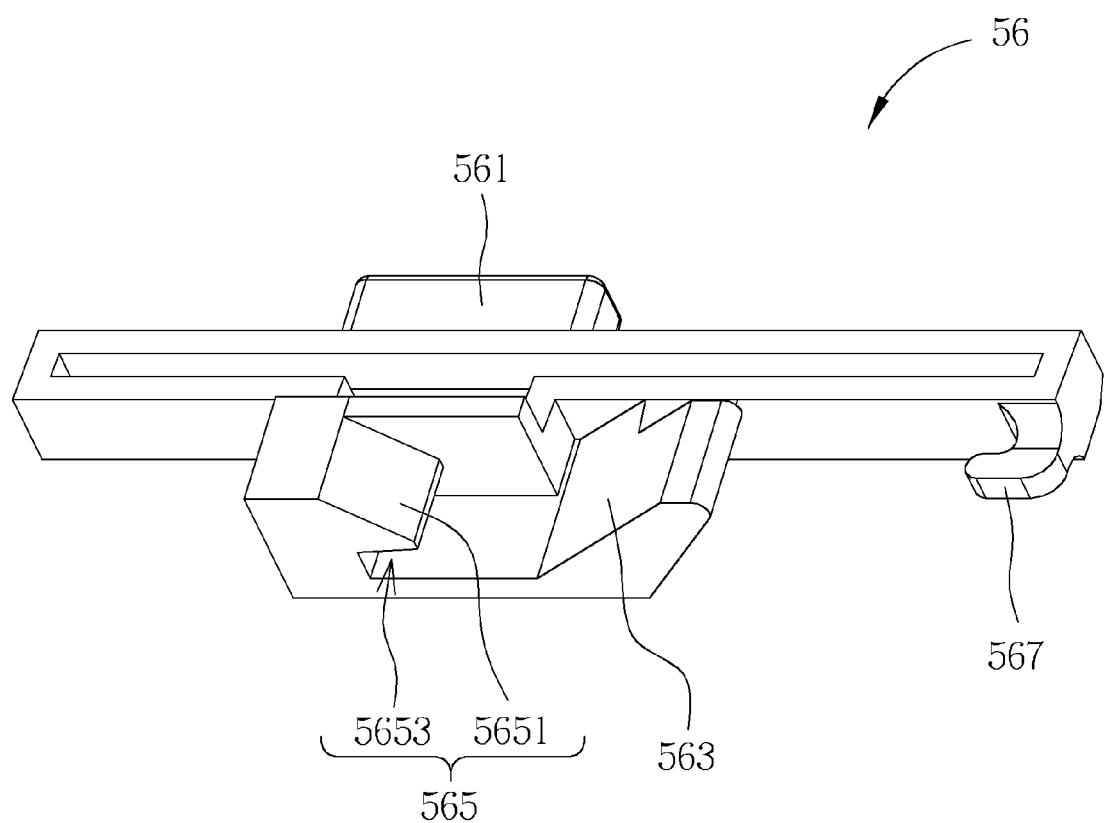
Figure 10:
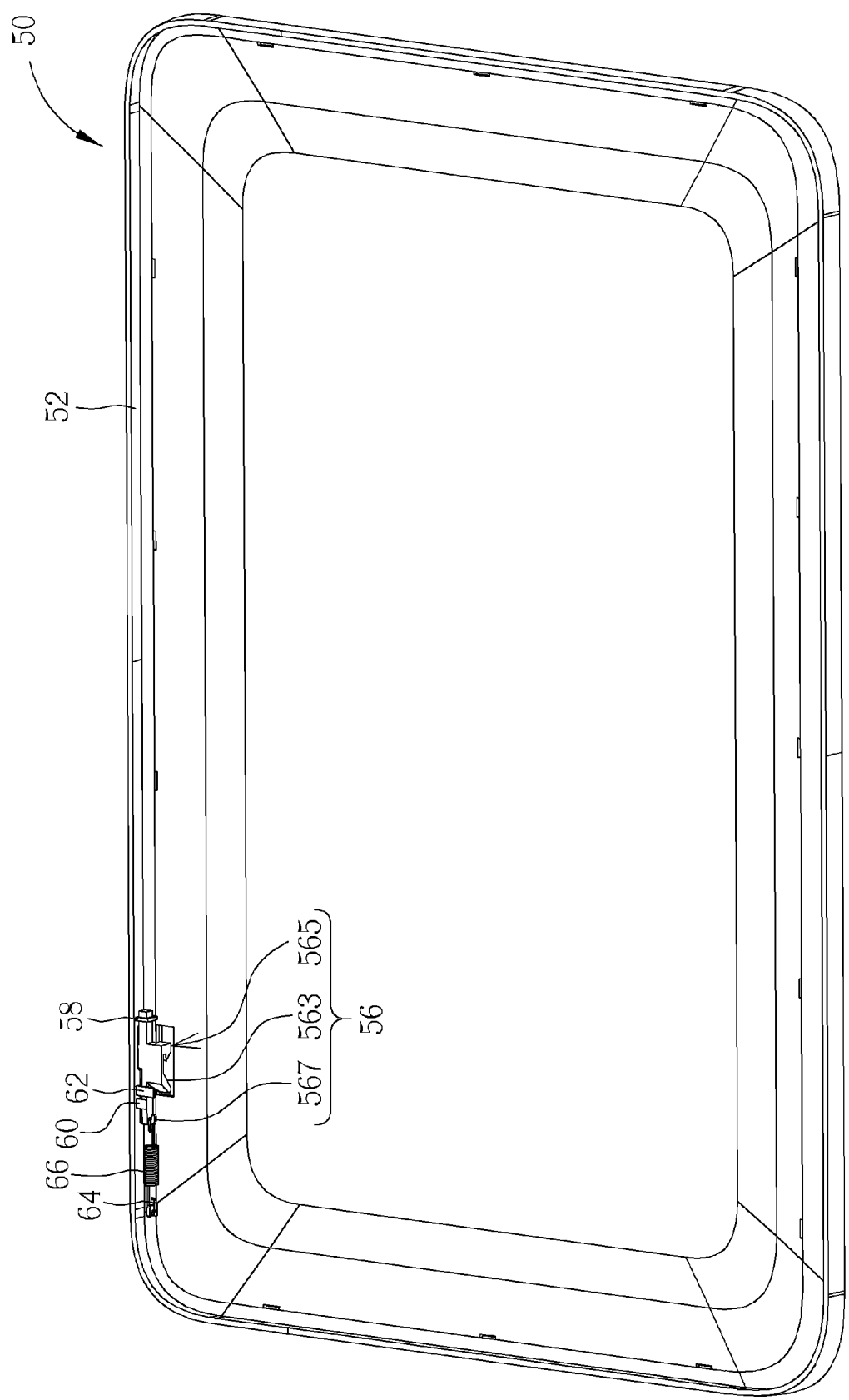
FIG. 10 is a diagram illustrating that the sliding button is installed on the supporting base in different views according to the embodiment of the present invention.

Please refer to FIG. 5 to FIG. 7. FIG. 5 and FIG. 6 are respectively diagrams of the ornamental plate 54 in different views according to the embodiment of the present invention. FIG. 7 is a partly enlarged diagram of the ornamental plate 54 according to the embodiment of the present invention. The ornamental plate 54 includes a plate 541, at least one hooking component 543 and a fixing component 545. The hooking component 543 is installed on a side of the plate 541 for hooking the supporting base 52. For example, the hooking component 543 can be a hook. As for the hook with larger rigidity, it can only be detached by rotation. As for the hook with smaller rigidity, it can be detached by enforcement. The fixing component 545 is installed on the plate 541. The fixing component 545 includes a wedging portion 5451, a second sliding portion 5453 and an assembly surface 5455. Please refer to FIG. 8 to FIG. 10. FIG. 8 and FIG. 9 are respectively diagrams of the sliding button 56 in different views according to the embodiment of the present invention. FIG. 10 is a diagram illustrating that the sliding button 56 is installed on the supporting base 52 in different views according to the embodiment of the present invention. The sliding button 56 is installed on the side of the supporting base 52 in a slidable manner. The sliding button 56 includes a button portion 561, a first sliding portion 563, a fastening portion 565 and a resilient component hook 567. The button portion 561 is disposed through the hole 523 on the supporting base 52 in a slidable manner. When the sliding button 56 is installed on the supporting base 52, the first sliding portion 563 is disposed in a position corresponding to the slot 521 on the supporting base 52. Furthermore, the fastening portion 565 is connected to the first sliding portion 563 and disposed in a position corresponding to the slot 521 on the supporting base 52. An incline 5651 and a wedging slot 5653 are formed on the fastening portion 565. In addition, the ornamental plate structure 50 further includes a resilient component 66 with both ends being respectively connected to the supporting base 52 and the sliding button 56. In other words, the both ends of the resilient component 66 can be respectively hooked with the resilient component hook 64 on the supporting base 52 and the resilient component hook 567 of the sliding button 56, so as to drive the sliding button 56 to slide relative to the supporting base 52. In this embodiment, the resilient component 66 can be a spring, a resilient clip and so on.

Figure 11:
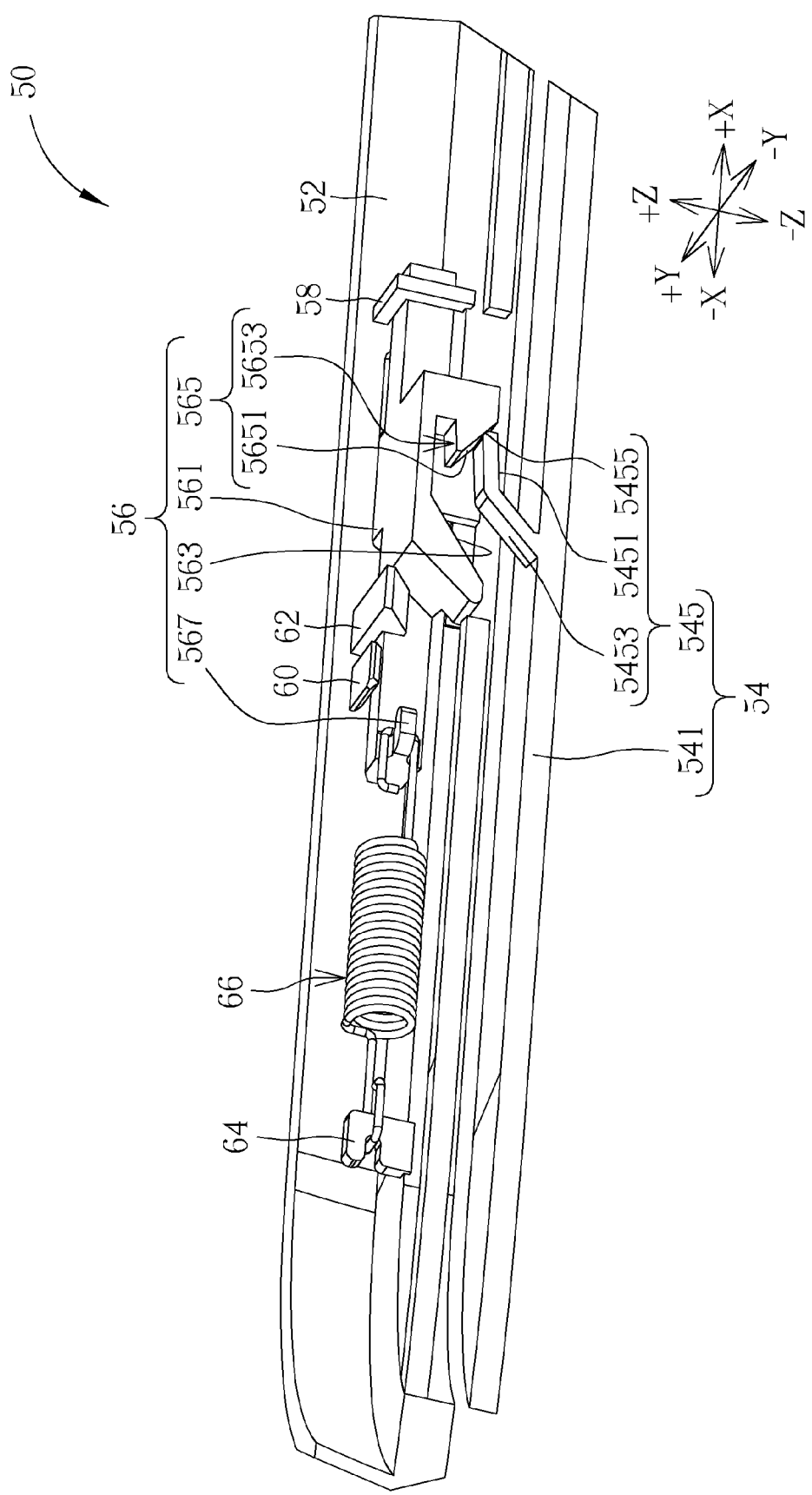
FIG. 11 to FIG. 14 is respectively a diagram illustrating the sliding button and the ornamental plate in different relative positions according to the embodiment of the present invention.
Figure 12:
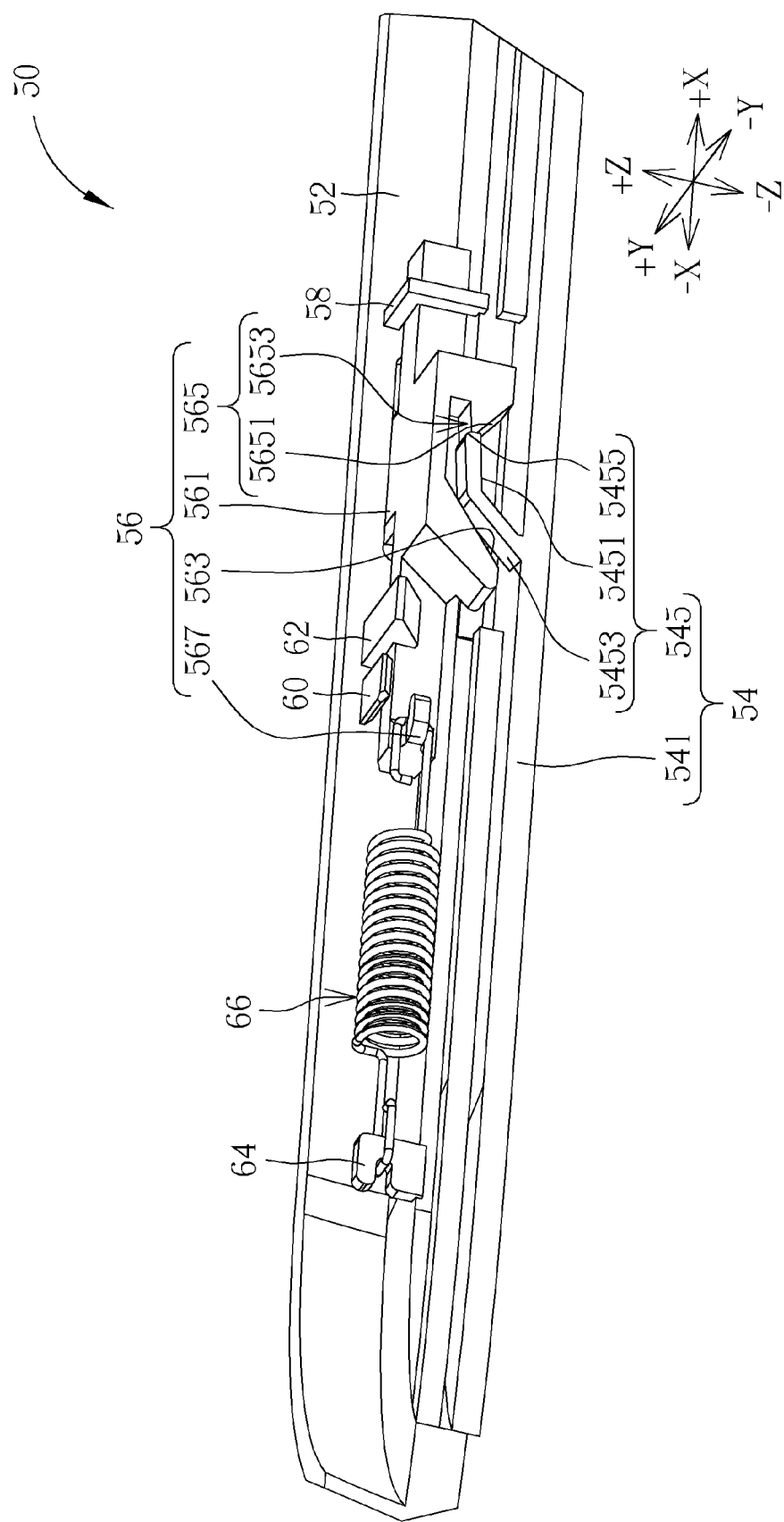
Figure 13:
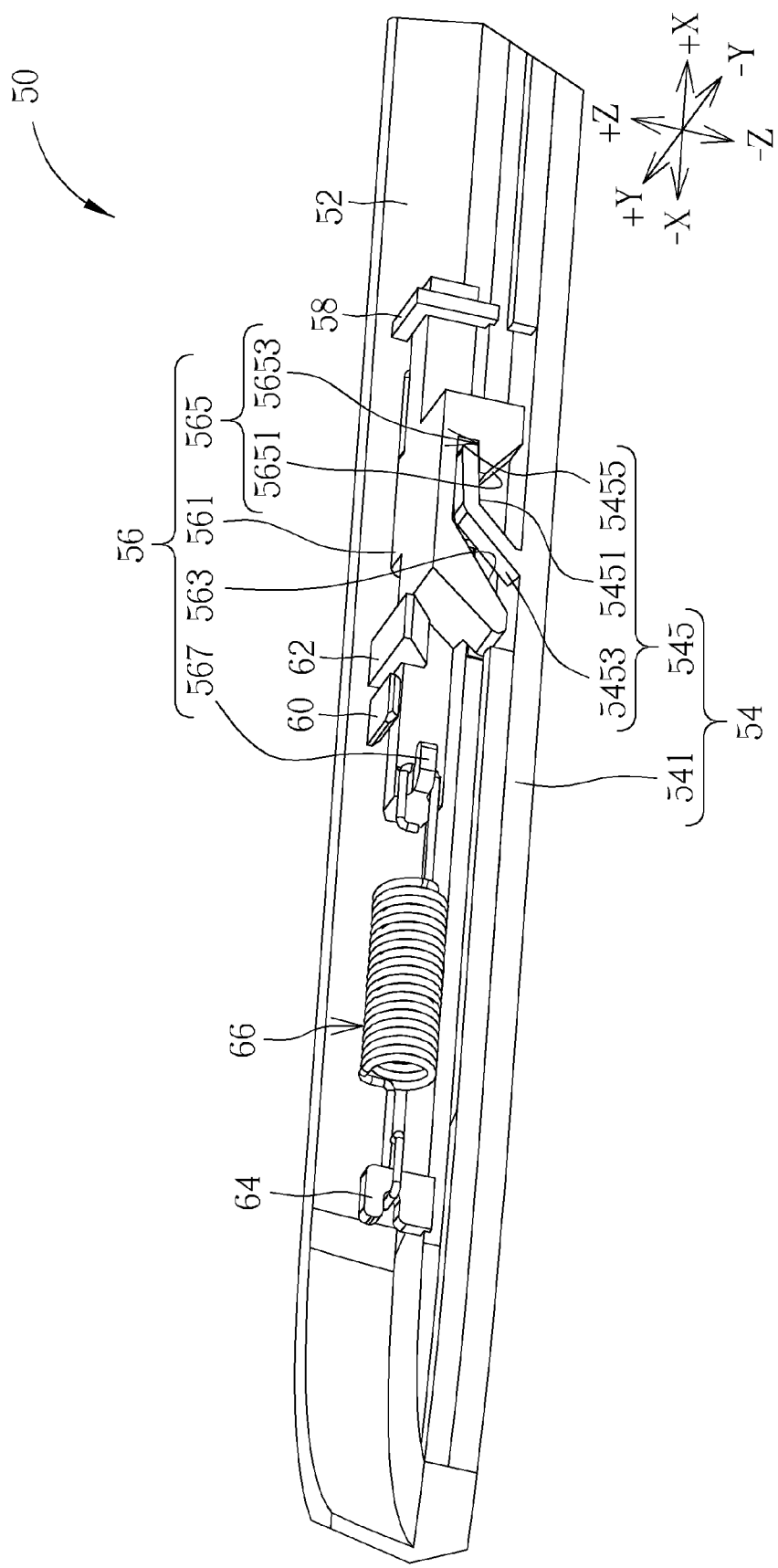
Figure 14:
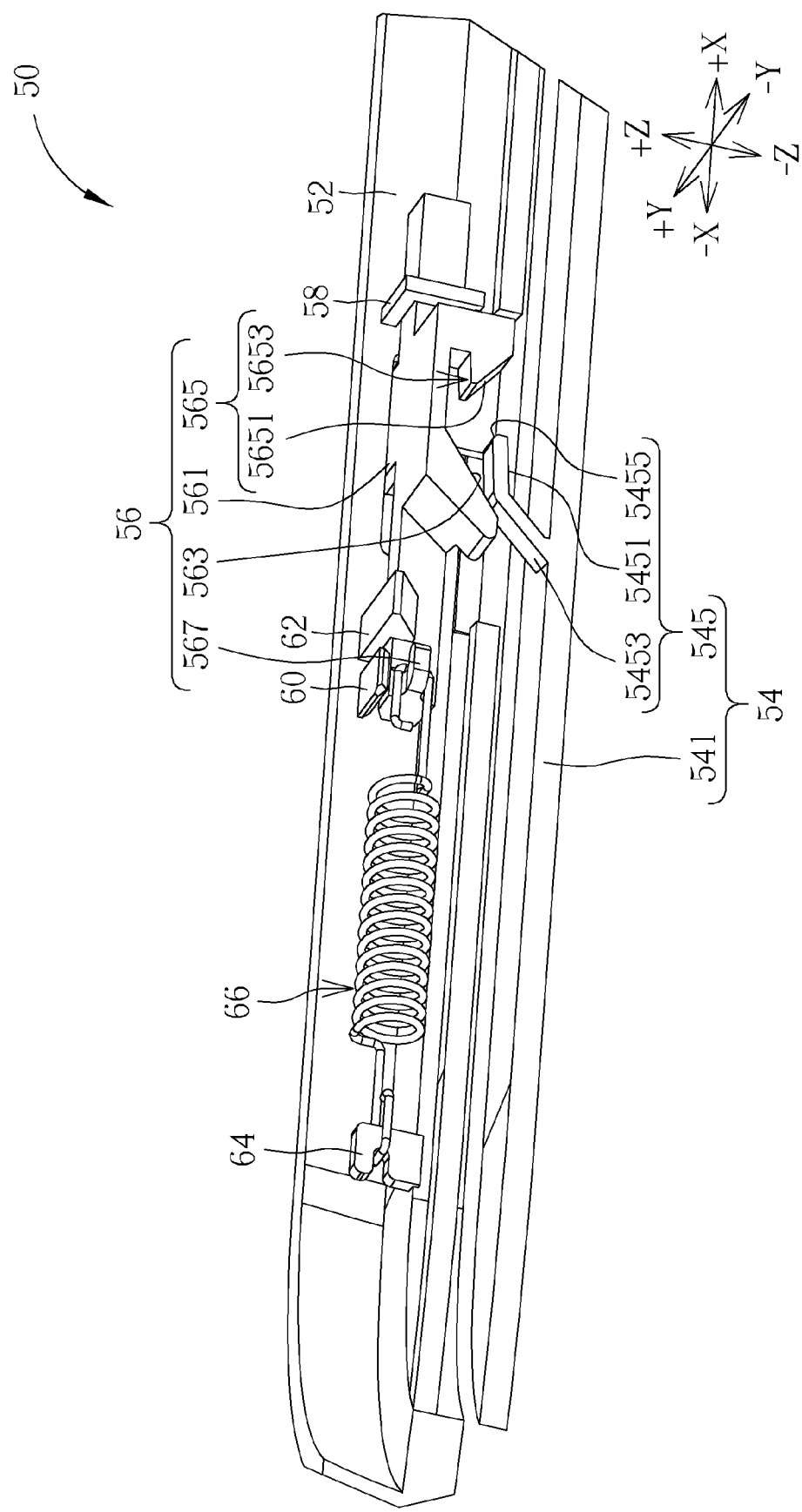

Please refer to FIG. 11 to FIG. 14. FIG. 11 to FIG. 14 is respectively a diagram illustrating the sliding button 56 and the ornamental plate 54 in different relative positions according to the embodiment of the present invention. When the ornamental plate 54 is desired to be installed on the supporting base 52, the hooking component 543 of the ornamental plate 54 can hook with the supporting base 52 first, and then the ornamental plate 54 can be rotated for assembly. In other words, the ornamental plate 54 is pressed in a +Z direction, i.e. a second direction, such that the assembly surface 5455 of the fixing component 545 of the ornamental plate 54 presses the fastening portion 565 of the sliding button 56 in the +Z direction, i.e. the second direction. As shown in FIG. 11 to FIG. 12, the assembly surface 5455 slides relative to the incline 5651 of the fastening portion 565 in the meanwhile, so as to drive the sliding button 56 to slide in a first direction, i.e. a +X direction. In this embodiment, the assembly surface 5455 can be an arc surface, so that the assembly surface 5455 can slide more smoothly relative to the incline 5651. In the meanwhile, the resilient component 66 connected to the sliding button 56 is in a deformed status, such as a stretched status. After the assembly surface 5455 of the fixing component 545 slides relative to the incline 5651 at a predetermined distance, the assembly surface 5455 of the fixing component 545 separates from the incline 5651 of the fastening portion 565. In the meanwhile, since the incline 5651 of the fastening portion 565 can not stop the assembly surface 5455 of the fixing component 545 from moving in a −X direction, the resilient component 66 connected to the supporting base 52 and the sliding button 56 will recover to an undeformed status. In other words, the resilient component 66 can provide the sliding button 56 with a resilient force, so as to drive the sliding button 56 to move in a direction opposite to the first direction, i.e. a −X direction. As shown in FIG. 13, the wedging portion 5451 of the fixing component 545 wedges inside the wedging slot 5653 on the fastening portion 565 in the meanwhile. In such a manner, the fixing component 545 and the hooking component 543 can fix the ornamental plate 54 on the supporting base 52, cooperatively. Furthermore, the stopper 60 can stop the sliding button 56, so as to constrain the sliding button 56 from deforming in the +Z direction, i.e. the second direction. The constraining component 58 is disposed through an end of the sliding button 56 and the hook 62 can be used for hooking the sliding button 56, so as to constrain moving direction of the sliding button 56. For example, the sliding button 56 can be constrained to be only capable of moving in the ±X direction while incapable of moving in the ±Y direction, so as to enhance stability of movement of the sliding button 56.

When the ornamental plate 54 is desired to be detached from the supporting base 52, the button portion 561 of the sliding button 56 is pushed inside the hole 523 on the supporting base 52 in the +X direction, i.e. the first direction, so as to drive the first sliding portion 563 of the sliding button 56 to slide relative to the second sliding portion 5453 of the fixing component 545 of the ornamental plate 54. Accordingly, the wedging portion 5451 of the fixing component 545 separates from the wedging slot 5653 on the fastening portion 565. In the meanwhile, the inclined plane 525 on the side of the hole 523 on the supporting base 52 can guide the button portion 561 to move in the +X direction, i.e. the first direction, such that the sliding button 56 can slide more smoothly. Finally, the fastening portion 565 can recover to separate from the fixing component 545 of the ornamental plate 54, as shown in FIG. 11, so as to release the constraint between the sliding button 56 and the ornamental plate 54. Accordingly, the ornamental plate 54 can be detached from the supporting base 52, so as to replace the ornamental plate 54 by movement of the sliding button 56. As known above, the assembly mechanism, i.e. the assembly surface 5455 and the incline 5651, and the detachment mechanism, i.e. the first sliding portion 563 and the second sliding portion 5453 are separate mechanisms, so as to enhance structural stability.

Compared to the prior art, the ornamental plate structure of the present invention provides the detachable ornamental plate assembled and dissembled by sliding the sliding button and capable of being surrounded by other components. In addition, the ornamental plate structure of the present invention has advantages of simpler structures, fewer components and less mechanical space occupied. Accordingly, the present invention provides an ornamental plate structure with easy assembly and less assembly cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ornamental plate structure, comprising:
    a supporting base whereon a slot and a hole are disposed;
    a sliding button installed on a side of the supporting base in a slidable manner and comprising:
        a button portion disposed through the hole on the supporting base in a slidable manner;
        a first sliding portion disposed in a position corresponding to the slot on the supporting base; and
        a fastening portion connected to the first sliding portion and disposed in a position corresponding to the slot on the supporting base, an incline and a wedging slot being formed on the fastening portion;
    an ornamental plate installed on the supporting base in a detachable manner, comprising:
        a plate;
        a hooking component installed on a side of the plate for hooking the supporting base; and
        a fixing component installed on the plate, the fixing component comprising a wedging portion, a second sliding portion and an assembly surface, the wedging portion wedging inside the wedging slot of the fastening portion after the assembly surface slides relative to the incline of the fastening portion at a predetermined distance, so as to fix the ornamental plate on the supporting base, the button portion driving the first sliding portion to slide relative to the second sliding portion when the button portion is pushed to move in a first direction inside the hole on the supporting base, so as to separate the wedging portion of the ornamental plate from the wedging slot on the fastening portion; and
    a resilient component with both ends being respectively connected to the supporting base and the sliding button, for driving the sliding button, such that the wedging portion of the ornamental plate wedges the wedging slot on the fastening portion.

2. The ornamental plate structure of claim 1, wherein the sliding button slides in the first direction when the assembly surface of the fixing component presses the fastening portion in a second direction and slides relative to the incline of the fastening portion, and the resilient component drives the sliding button to move in a direction opposite to the first direction when the assembly surface of the fixing component separates from the incline of the fastening portion, such that the wedging portion of the ornamental plate wedges inside the wedging slot of the fastening portion.

3. The ornamental plate structure of claim 2, further comprising a stopper installed on the supporting base for stopping the sliding button, so as to constrain deformation of the sliding button in the second direction.

4. The ornamental plate structure of claim 1, wherein the assembly surface is an arc surface.

5. The ornamental plate structure of claim 1, further comprising a constraining component installed on the supporting base and disposed through an end of the sliding button for constraining the sliding button to slide in the first direction.

6. The ornamental plate structure of claim 4, wherein the constraining component is an L-shaped rib.

7. The ornamental plate structure of claim 1, wherein an inclined plane is formed on at least one side of the hole of the supporting base, for guiding the button portion to slide in the first direction.

8. The ornamental plate structure of claim 1, further comprising a hook installed on the supporting base for hooking the sliding button, so as to constrain moving direction of the sliding button.

9. The ornamental plate structure of claim 1, further comprising two resilient component hooks respectively installed on the supporting base and the sliding button for hooking both ends of the resilient component.

10. The ornamental plate structure of claim 1, wherein the resilient component is a spring.

* * * * *

UNITED STATES PATENT AND TRADEMARK OFFICE
CERTIFICATE OF CORRECTION

PATENT NO. : 8,808,832 B2  
APPLICATION NO. : 13/450450  
DATED : August 19, 2014  
INVENTOR(S) : Chen-Yi Liang et al.

Page 1 of 1

It is certified that error appears in the above-identified patent and that said Letters Patent is hereby corrected as shown below:

On the title page, item (54) and in the Specification, Col. 1, correct the title of invention from "PLATE WITH EASY ASSEMBLY" to --ORNAMENTAL PLATE WITH EASY ASSEMBLY--.

Signed and Sealed this  
Eleventh Day of November, 2014

Michelle K. Lee  
*Deputy Director of the United States Patent and Trademark Office*